US011030100B1

(12) United States Patent
Yu et al.

(10) Patent No.: US 11,030,100 B1
(45) Date of Patent: Jun. 8, 2021

(54) EXPANSION OF HBA WRITE CACHE USING NVDIMM

(71) Applicant: International Business Machines Corporation, Armonk, NY (US)

(72) Inventors: Jiang Yu, Shanghai (CN); Chun Yao, Shanghai (CN); Hong Xin Hou, Shanghai (CN); Yu Sun, Shanghai (CN); Shu Luo, Shanghai (CN); Wen Jun Jin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/687,646

(22) Filed: Nov. 18, 2019

(51) Int. Cl.
*G06F 12/0804* (2016.01)

(52) U.S. Cl.
CPC .... *G06F 12/0804* (2013.01); *G06F 2212/604* (2013.01)

(58) Field of Classification Search
CPC ........................ G06F 12/0804; G06F 2212/604
See application file for complete search history.

(56) References Cited

U.S. PATENT DOCUMENTS

| 9,720,603 | B1 | 8/2017 | Salazar | |
|---|---|---|---|---|
| 2007/0204189 | A1* | 8/2007 | Soetemans | G11C 29/025 714/718 |
| 2016/0026399 | A1 | 1/2016 | Purkayastha | |
| 2016/0062897 | A1 | 3/2016 | Price | |
| 2016/0350002 | A1* | 12/2016 | Vergis | G06F 12/02 |
| 2017/0160779 | A1 | 6/2017 | Park | |
| 2017/0293343 | A1* | 10/2017 | Chinnakkonda Vidyapoornachary | G06F 1/3275 |
| 2018/0095879 | A1* | 4/2018 | Han | G06F 12/0868 |
| 2019/0235599 | A1* | 8/2019 | Yuasa | G06F 1/30 |

FOREIGN PATENT DOCUMENTS

| CN | 103336745 A | 10/2013 |
|---|---|---|
| CN | 107861901 A | 3/2018 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

*Primary Examiner* — Sean D Rossiter
(74) *Attorney, Agent, or Firm* — Richard B. Thomas

(57) ABSTRACT

Embodiments relate to a system, program product, and method for expanding the retention capacity of a write cache on a host bus adaptor (HBA) device through the use of non-volatile dual in-line memory modules (NVDIMMs). At least a portion of the existing NVDIMM capacity is leveraged to temporarily retain data that is to be written to persistent storage to reduce the potential for data loss during external electric power disruptions. A NVDIMM HBA Write Cache Module (NHWCM) facilitates the data file traffic transmission and I/O command generation and transmission between a processing device, the HBA device, the NVDIMMs, and the persistent storage.

20 Claims, 13 Drawing Sheets

US 11,030,100 B1

EXPANSION OF HBA WRITE CACHE USING NVDIMM

BACKGROUND

The present disclosure relates to expansion of host bus adaptor (HBA) write cache using non-volatile dual in-line memory modules (NVDIMMs), and, more specifically, to use at least a portion of available NVDIMM capacity to retain data that is to be written to persistent storage to reduce the potential for data loss during power cycling.

HBAs are typically used as a data bridge between a host system including one or more processing units, e.g., in one or more servers, and one or more external persistent storage devices in operable communication therewith. The HBAs perform tasks that would otherwise require the use of resources within the processing unit(s), e.g., storing and retrieving data, thereby improving the performance of the processing unit(s). At least some known HBAs include built-in, onboard cache to facilitate temporary storage of write data that is in the process of being transmitted from the processing unit(s) to the persistent storage. The capacity of the HBA write cache is normally within a range of approximately 4 gigabytes (GB) and to approximately 16 GB.

SUMMARY

A system, computer program product, and method are provided for facilitating expansion of host bus adaptor (HBA) write cache using non-volatile dual in-line memory modules (NVDIMMs) to use at least a portion of available NVDIMM capacity to retain data that is to be written to persistent storage to reduce the potential for data loss during power cycling.

In one aspect, a computer system is provided to support the expansion of the HBA write cache with the NVDIMMs. As shown, the system includes a HBA, at least one persistent storage device in communication with the HBA, and at least one NVDIMM. The system also includes a processing device that includes a NVDIMM HBA Write Cache Module (NHWCM), where the NHWCM is in communication with the HBA and the NVDIMM. The NHWCM functions to determine if there is a least one file to be written to persistent storage from the processing device. The NHWCM also determines that the NVDIMM includes sufficient storage capacity for storage of the file. The NHWCM writes the file to the NVDIMM. The NHWCM also determines that the HBA is available to receive the file from the NVDIMM and writes the file to the persistent storage from the NVDIMM through the HBA.

In another aspect, a computer program product is provided to enhance file data management. The computer program product includes one or more computer readable storage media with program instructions collectively stored thereon. Program instructions are provided to determine there is a least one file to be written to persistent storage from a processing device. The program instructions determine that at least one non-volatile dual in-line memory module (NVDIMM) includes sufficient storage capacity for storage of the file. The program instructions write the file to the NVDIMM. Program instructions are further provided to determine that a host bus adaptor (HBA) is available to receive the file from the NVDIMM, and write the file to persistent storage from the NVDIMM through the HBA.

In yet another aspect, a computer-implemented method to enhance file data management.is provided. The method includes determining there is a least one file to be written to persistent storage from a processing device. The method also includes determining that at least one non-volatile dual in-line memory module (NVDIMM) includes sufficient storage capacity for storage of the file. The file is written to the NVDIMM. The method further includes writing the file to the NVDIMM. It is determined that a host bus adaptor (HBA) is available to receive the file from the NVDIMM and the file is written to persistent storage from the NVDIMM through the HBA.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
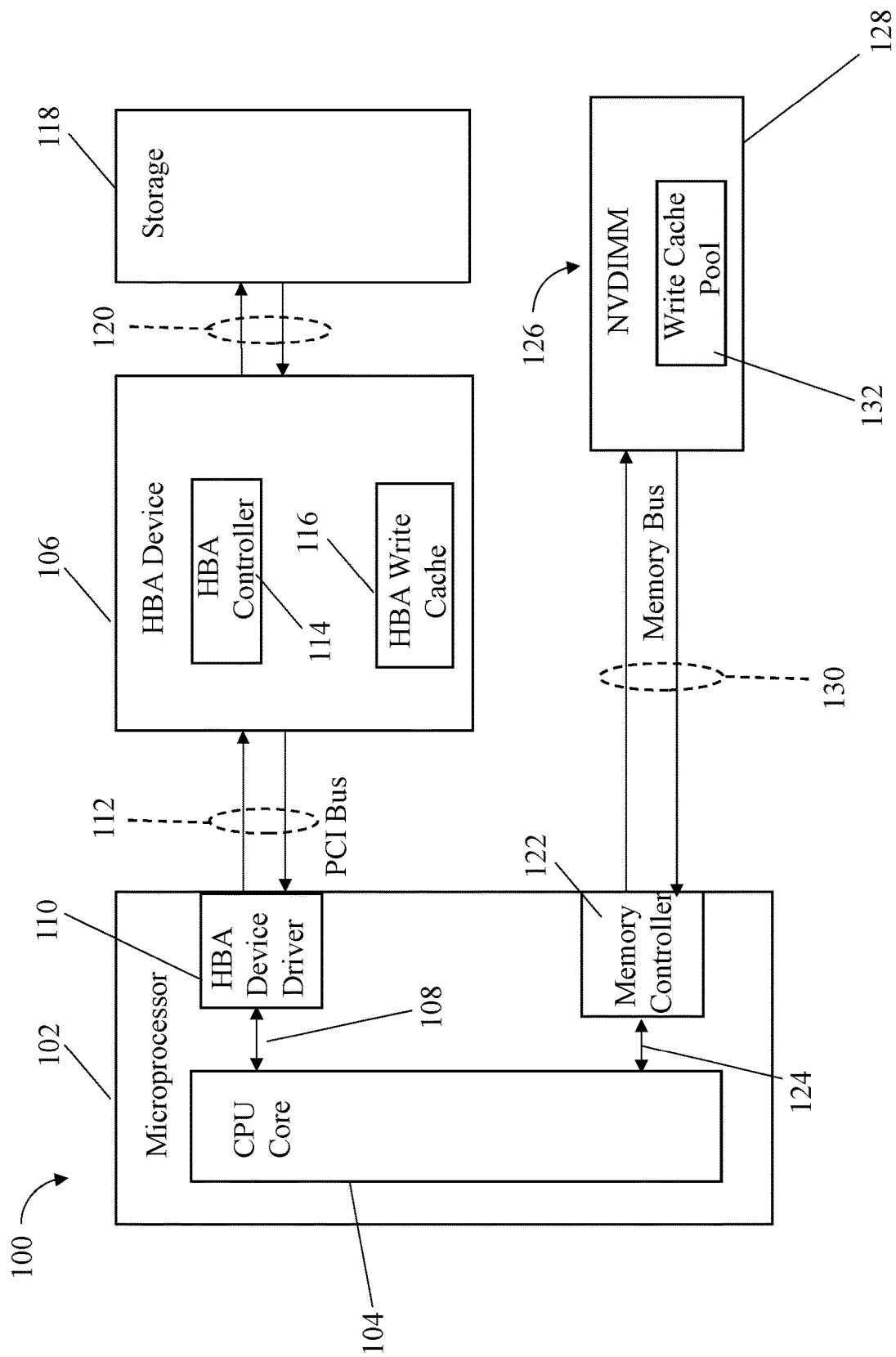
FIG. 1 depicts a schematic diagram illustrating a computing environment suitable for operation of host bus adaptor (HBA) write cache expansion using non-volatile dual in-line memory modules (NVDIMMs), in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Systems with an HBA device in operable communication between a processing device and persistent storage display an improved performance due to the write cache on the HBA device performing data storage and facilitating retrieval tasks that would otherwise require the resources of the processor. These HBA devices include features that facilitate providing emergency power to the write cache to permit sufficient time for flushing the data resident on the HBA write cache to the persistent storage without losing the data. These features include power storage devices, e.g., battery devices and/or capacitive devices, coupled to the write cache. These power storage devices provide short-term, temporary power to the write cache to reduce the potential for data loss in the event of a power disturbance while the data resident thereon is flushed to the storage devices. Increasing the size of the HBA write cache facilitates improved performance of the systems, while the increased cache size has an increased temporary backup power requirement. The increased power support necessitates an increase in the size of such power storage devices. Industrial, technical, and commercial parameters limit the size of the HBA devices. In addition, the increased data residency on the HBA write cache requires additional time to flush the data to the persistent storage. Accordingly, increasing the write cache and associated power backup features on the HBA devices is impractical.

A system, method, and computer program product are disclosed and described herein for using NVDIMM resources for expanding the capacity of the HBA write cache. A portion of one or more of the NVDIMM resources are defined within a "pool," i.e., a NVDIMM for HBA write cache pool. Such use of the pool resources to receive and temporarily store files transferring from the CPU to the persistent storage alleviates the need to increase the size and capacity of the HBA write cache and the associated backup power resources to improve system performance. Upon issuance of a write command via the CPU, a novel module in the kernel space of the CPU, i.e., the NVDIMM HBA write cache module (NHWCM) determines if there is sufficient storage capacity on the pool to receive the file(s) directed to be transmitted to the persistent storage from the CPU. If such storage capacity is available, the files are written to the pool for temporary storage until the HBA write cache is available to receive the files for writing to the persistent storage. In one embodiment, if sufficient storage capacity is not available on the pool, the files are transmitted directly to the HBA write cache for transmission to persistent storage while the pool maintains the previous files in safe storage until the HBA write cache becomes available.

In one embodiment, if sufficient storage capacity is not available on the pool and the HBA device is not available, one or more files on the NVDIMM pool that are resident on the persistent storage (likely due to a previous writing) and have timestamps with a predetermined vintage, e.g., the oldest timestamps, are overwritten with the new file or files. The size and costs associated with the HBA device architecture are constrained, thereby facilitating the commercial attractiveness of computer systems including such architectural features. In addition, the constraining the volume of the data residency on the HBA write cache alleviates the requirement for additional time to flush the data from the HBA device to the persistent storage. Accordingly, the integration of the NVDIMM storage resources with the HBA write cache resources results in a practical application of an improvement to the functioning of the associated computing systems, and specifically, the file management features of the computing systems, Referring to FIG. 1, a schematic diagram is provided illustrating a computing hardware environment, i.e., a computer system 100 suitable for operation of host bus adaptor (HBA) write cache expansion using non-volatile dual in-line memory modules (NVDIMMs). The computer system 100 includes a processing device, i.e., a microprocessor 102 that includes a central processing unit (CPU) core 104. In the illustrated embodiment, one CPU core 104 is shown. In some embodiments, the microprocessor 102 has multiple CPU cores 104, where the number of CPU cores 104 is non-limiting. For example, and without limitation, the microprocessor 102 is a dual-core, quad-core, hexa-core, or octo-core microprocessor 102.

The computer system 100 also includes a host bus adaptor (HBA) device 106 coupled in operable communication with the CPU core 104 through a first data conduit 108, a HBA device driver 110, and a peripheral component interconnect (PCI) bus 112. In one embodiment, the first data conduit 108 and the HBA device driver 110 are resident within the microprocessor 102. The HBA device 106 includes an HBA controller 114 and an HBA write cache 116. The computer system 100 further includes a persistent storage system, referred to hereon as persistent storage 118, coupled in operable communication with the HBA device 106 through a second data conduit 120. The persistent storage 118 includes any storage device or devices known in the art, including, without limitation, a plurality of disks configured in a redundant array of independent disks (RAID). Accordingly, one or more CPU cores 104 are communicatively coupled to the persistent storage 118 through an HBA device 106.

The microprocessor 102 also includes a memory controller 122 coupled in operable communication with the CPU core 104 through a third data conduit 124. The memory controller 122 is coupled in operable communication with memory 126 that includes one or more NVDIMMs 128 through a memory bus 130. The memory 126 defines an HBA write cache pool 132 that is sometimes referred to as virtual HBA write cache. The memory 126, NVDIMMs 128 and the NVDIMM for HBA write cache pool 132 are described further herein. The operation of the computer system 100 is described further herein in association with FIGS. 4-6. Accordingly, one or more CPU cores 104 are communicatively coupled to one or more NVDIMMs 128.

In one embodiment, the architecture and protocols of the computer system 100 are based on one or more small computer system interface (SCSI) parallel interface standards. In one or more embodiments, the architecture of the computer system 100 is based on one or more SCSI-based standards to facilitate operation within enterprise systems, for example, and without limitation, serial attached SCSI (SAS) and Internet SCSI (iSCSI) peripheral connection architectures and protocols. Accordingly, the computer system 100 uses SCSI-based peripheral interconnect architecture and protocol standards. In at least one alternative embodiment, the architecture of the computer system 100 is based on a non-volatile memory express (NVMe) architecture and the appropriate standards and protocols.

Figure 2:
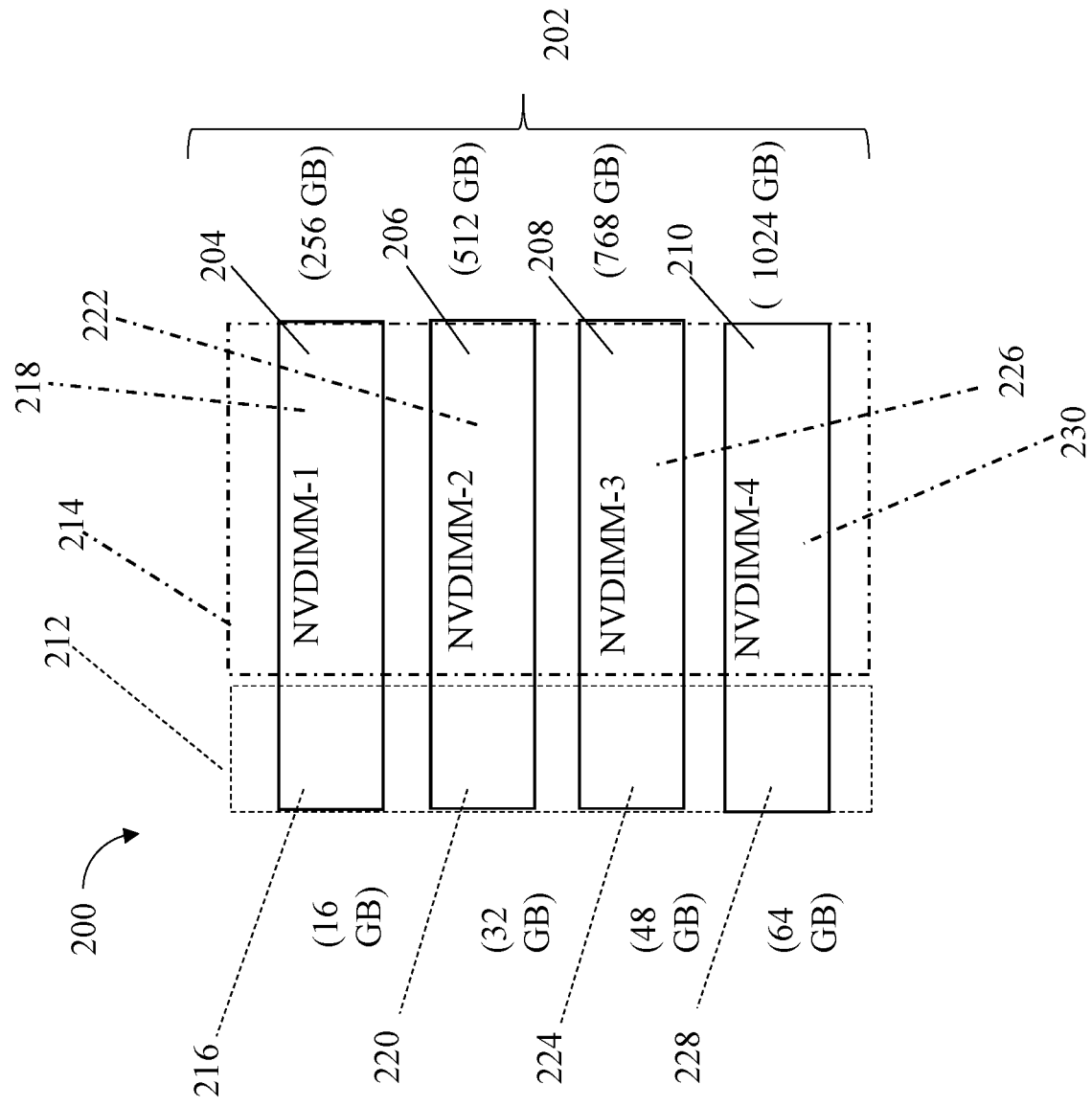
FIG. 2 depicts a schematic diagram illustrating an example NVDIMM HBA write cache pool configuration, in accordance with some embodiments of the present disclosure.

Referring to FIG. 2, a schematic diagram is provided illustrating an example NVDIMM HBA write cache pool configuration 200. An array of NVDIMMs 202 includes four NVDIMMs, i.e., a first NVDIMM 204, a second NVDIMM 206, a third NVDIMM 208, and a fourth NVDIMM 210, where the quantity of NVDIMMs 204, 206, 208, and 210 is non-limiting. As used herein, the term "NVDIMM" refers to a type of random-access memory for computers with persistent, non-volatile memory features that facilitate retaining the resident data contents including through periods when electrical power is removed, for example from an unexpected power loss, system crash, or normal shutdown. The NVDIMMs 128 may be implemented as the array of NVDIMMs 202. The NVDIMMs 204, 206, 208, and 210 are fabricated with any technological features that enable operation of the computer system 100 and the NVDIMMs 204, 206, 208, and 210 as described herein, including, without limitation, flash storage features. In at least one embodiment, each of the NVDIMMs 204, 206, 208, and 210 has a memory storage capacity of approximately 256 GB, such that the array 202 has a total memory storage capacity of approximately 1024 GB. In one or more alternative embodiments, the array 202 includes NVDIMMs 204, 206, 208, and 210 of any size or combination of sizes that enables operation of the computer system 100 and the NVDIMMs 204, 206, 208, and 210 as described herein. Accordingly, the computer system 100 includes an array of NVDIMMs 202 to perform non-volatile memory storage of data.

The array of NVDIMMs 202 is divided into two sections. The first section is the NVDIMM for HBA write cache pool 212, hereon referred to as the pool 212, and sometimes referred to as virtual HBA write cache. The pool 132 may be implemented as the pool 212. The second section is the dynamic random access memory (DRAM) section, hereon referred to as the DRAM section 214, that performs the standard memory activities of the computer system 100. In one or more embodiments, each of the four NVDIMMs 204, 206, 208, and 210 is similarly divided into one 16 GB pool segment for the pool 212 and one 240 GB DRAM segment for the DRAM section 214. Specifically, the first NVDIMM 204 includes a first 16 GB pool segment 216 and a first 240 GB DRAM segment 218 and the second NVDIMM 206 includes a second 16 GB pool segment 220 and a second 240 GB DRAM segment 222. Similarly, the third NVDIMM 208 includes a third 16 GB pool segment 224 and a third 240 GB DRAM segment 226 and the fourth NVDIMM 210 includes a fourth 16 GB pool segment 228 and a fourth 240 GB DRAM segment 230. In at least one alternative embodiment, one or more of the pool segments 216, 220, 224, and 228 include more or less than 16 GB of persistent memory and one or more of the DRAM segments 218, 222, 226, and 230 include more or less than 240 GB of persistent memory. In one or more embodiments, data designated for the DRAM section 214 is permitted to overflow into the pool 212 and portions of the DRAM section 214 are permitted to receive data designated for the pool 212. In at least one alternative embodiment, the pool 212 is dedicated exclusively to supporting the HBA write cache 116 and the DRAM section 214 is dedicated to exclusively supporting the remainder of the operating requirements of computer system 100. Operation of the pool 212 is described further herein. Accordingly, the array of NVDIMMs 202 includes approximately 64 GB of persistent memory reserved for the pool 212 and approximately 960 GB reserved for the DRAM section 214.

Figure 3:
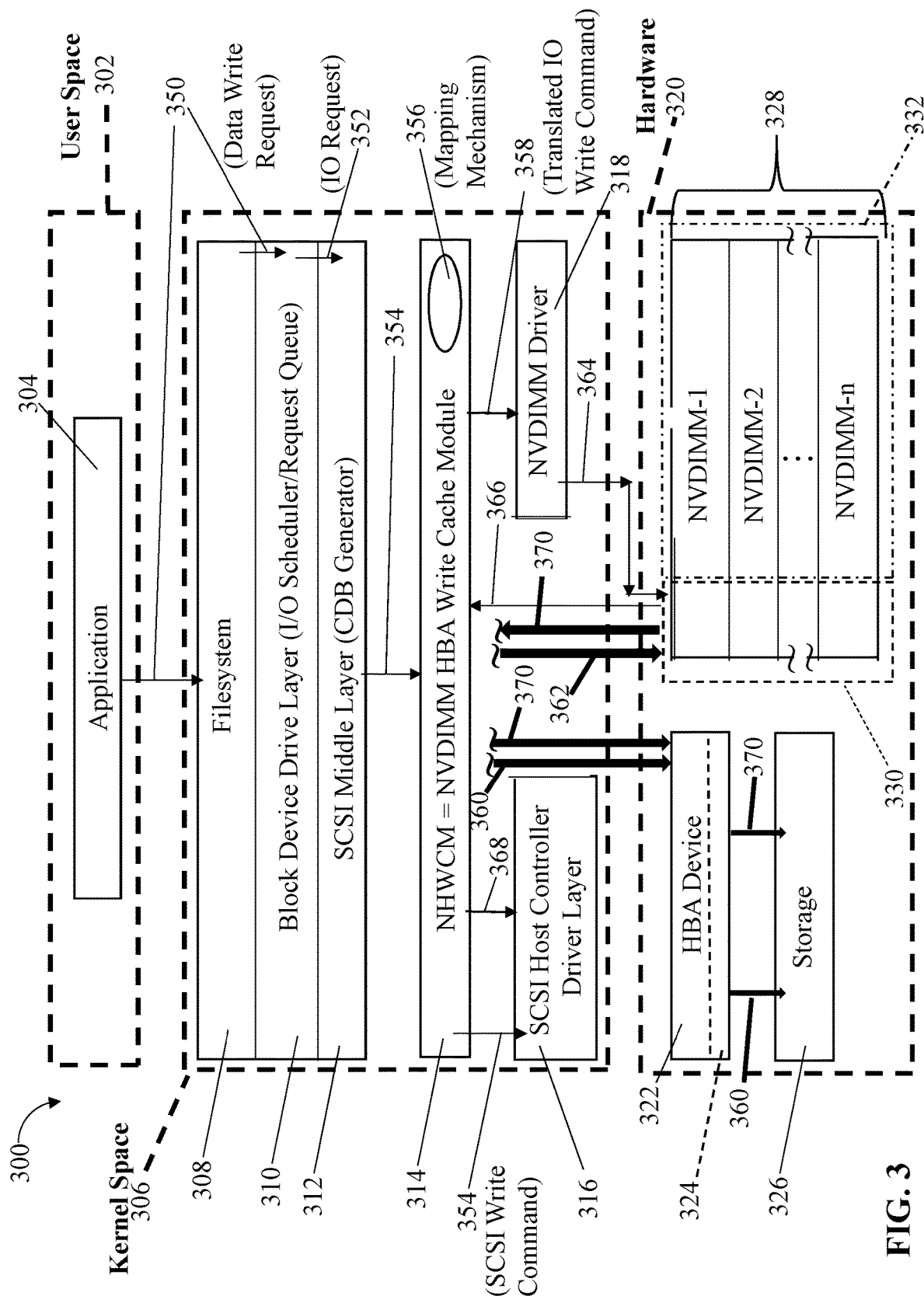
FIG. 3 depicts a functional block diagram illustrating an example computing software and hardware integration scheme to facilitate expansion of the HBA write cache using the NVDIMMs, in accordance with some embodiments of the present disclosure.

Referring to FIG. 3, a functional block diagram is provided illustrating an example computing software and hardware integration scheme 300 to facilitate expansion of the HBA write cache 116 using the NVDIMMs 202. The scheme 300 includes a user space 302 that is a portion of system memory, i.e., in one or more embodiments, the DRAM section 214, in which processes associated with a user application 304 are executed. The scheme 300 also includes a kernel space 306, i.e., in one embodiment, a portion of the DRAM section 214, where the kernel, i.e., the core of the operating system, executes and provides the associated services to the computer system 100. The kernel space 306 is in operative communication with the user space 302 and includes a filesystem 308 to facilitate a predetermined storage scheme on the persistent storage 326. In at least one embodiment, the application 304 and the filesystem 308 cooperate to generate a data write request 350. The kernel space 306 also includes a block device driver layer 310 that generates basic input/output (I/O) requests, schedules the requests, and queues the requests per the schedule. In one or more embodiments, the block device driver layer 310 generates an I/O request 352. The block device driver layer 310 is in operative communication with the filesystem 308. The kernel space 306 further includes a SCSI middle layer 312 in operable communication with the block device driver layer 310. In at least one embodiment, the SCSI middle layer 312 converts the I/O requests 352 from the block device driver layer 310 into a SCSI write command 354 through generation of a command descriptor block (CDB) generator (not shown).

The kernel space 306 includes a NVDIMM HBA write cache module (NHWCM) 314 in operable communication with the SCSI middle layer 312. The kernel space 306 also includes a SCSI host controller driver layer 316 and a NVDIMM driver 318, both communicatively coupled to the NHWCM 314. In contrast to coupling the SCSI middle layer 312 to the SCSI host controller driver layer 316, the NHWCM 314 is positioned between, and in operable communication with, the SCSI middle layer 312 and the SCSI host controller driver layer 316, as well as the NVDIMM driver 318 to further control data flow from the CPU core 104 of the microprocessor 102 to the HBA device 106, and to and from the array of NVDIMMs 202. The HBA device 106 may be implemented as an HBA device 322 and the array of NVDIMMs 202 may be implemented as an array of NVDIMMs 328, where the HBA device 322 and the array of NVDIMMs 328 are discussed further herein. The functionalities of the SCSI middle layer 312, NHWCM 314, SCSI host controller driver layer 316, and NVDIMM driver 318 are discussed further herein.

The scheme 300 further includes the hardware section 320 in operable communication with the kernel space 306. The hardware section 320 includes the HBA device 322 and the HBA write cache 324 coupled in operable communication with the SCSI host controller driver layer 316 and the persistent storage 326. The HBA write cache 116 may be implemented as the HBA write cache 324 and the persistent storage 118 may be implemented as the persistent storage 326. The hardware section 320 further includes the memory 126 shown as the NVDIMM array 328 that includes the pool 330 and the DRAM 332. The pool 212 may be implemented as the pool 330. The user space 302 and the kernel space 306 are implemented in memory 126, i.e., the NVDIMM array 328, however, they are shown in FIG. 3 as separate entities for illustrative purposes. The NHWCM 314 acts to reserve and hold the segments or portions 216, 220, 224, and 228 of the NVDIMMs 202 designated as the storage capacity in the NVDIMM array 328 for the virtual HBA write cache, i.e., the pool 330. Operation of the computing software and hardware integration scheme 300 is discussed further herein. Accordingly, an integrated scheme 300 for using a NHWCM 314 to leverage the memory storage capacity of the NVDIMM(s) 328 to expand the capacity of the HBA write cache 324 to store files while enroute to the persistent storage 326 during power disruptions that would otherwise jeopardize the integrity of those files.

Figure 4:
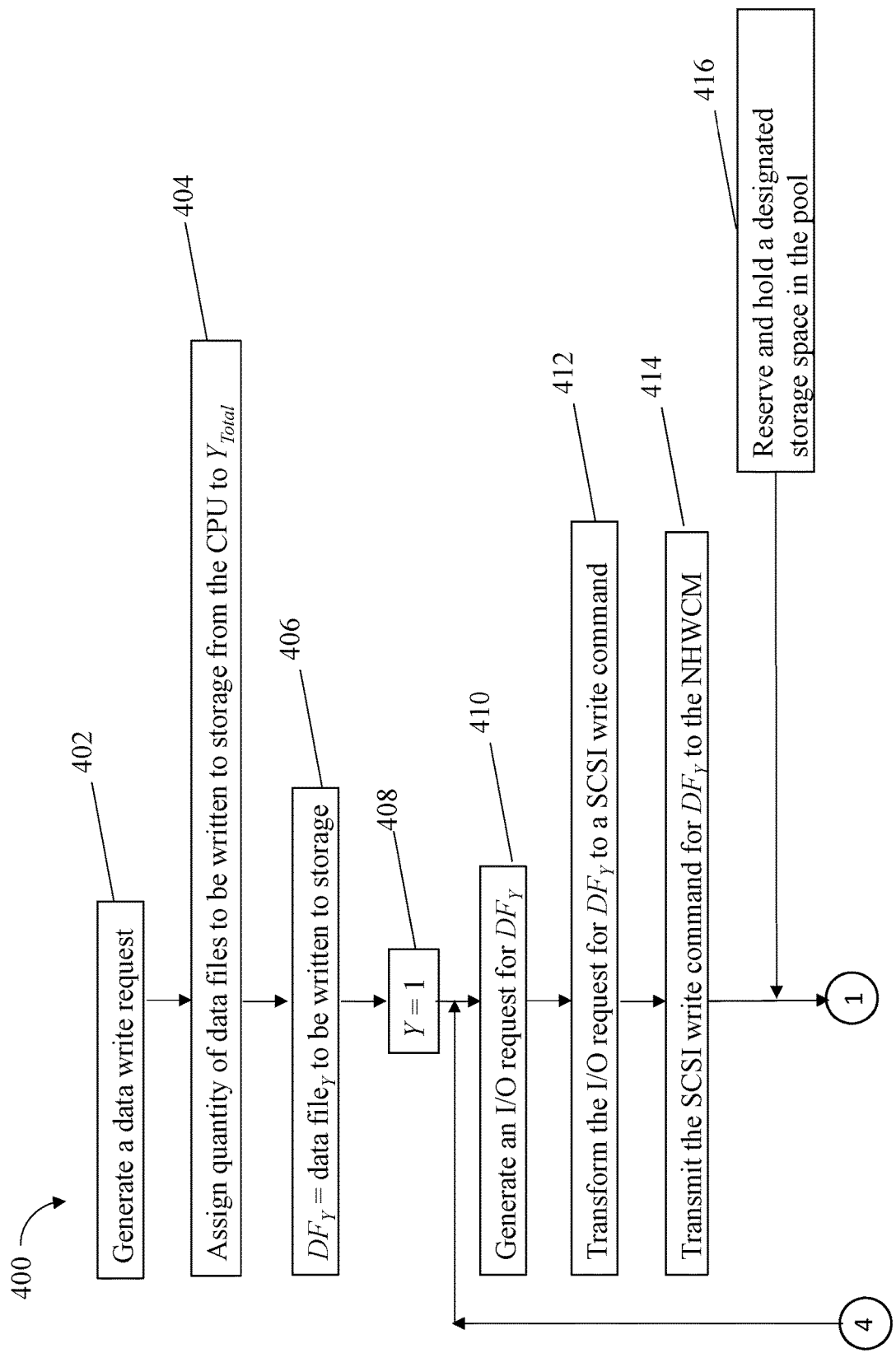
FIG. 4 depicts a flow chart illustrating a process for writing files from a processing unit to either the NVDIMM HBA write cache pool or the HBA write cache, in accordance with some embodiments of the present disclosure.
Figure 4:
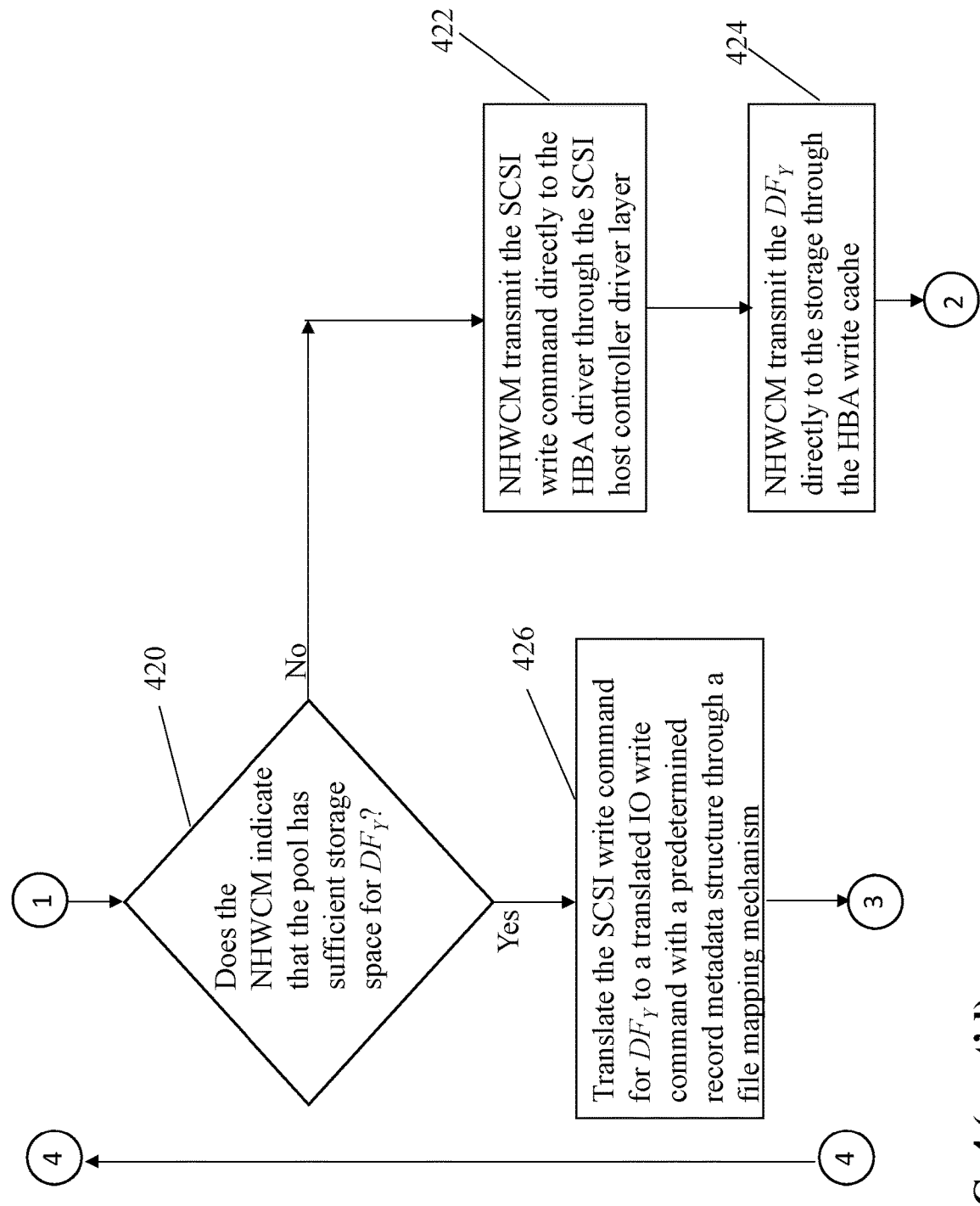
Figure 4:
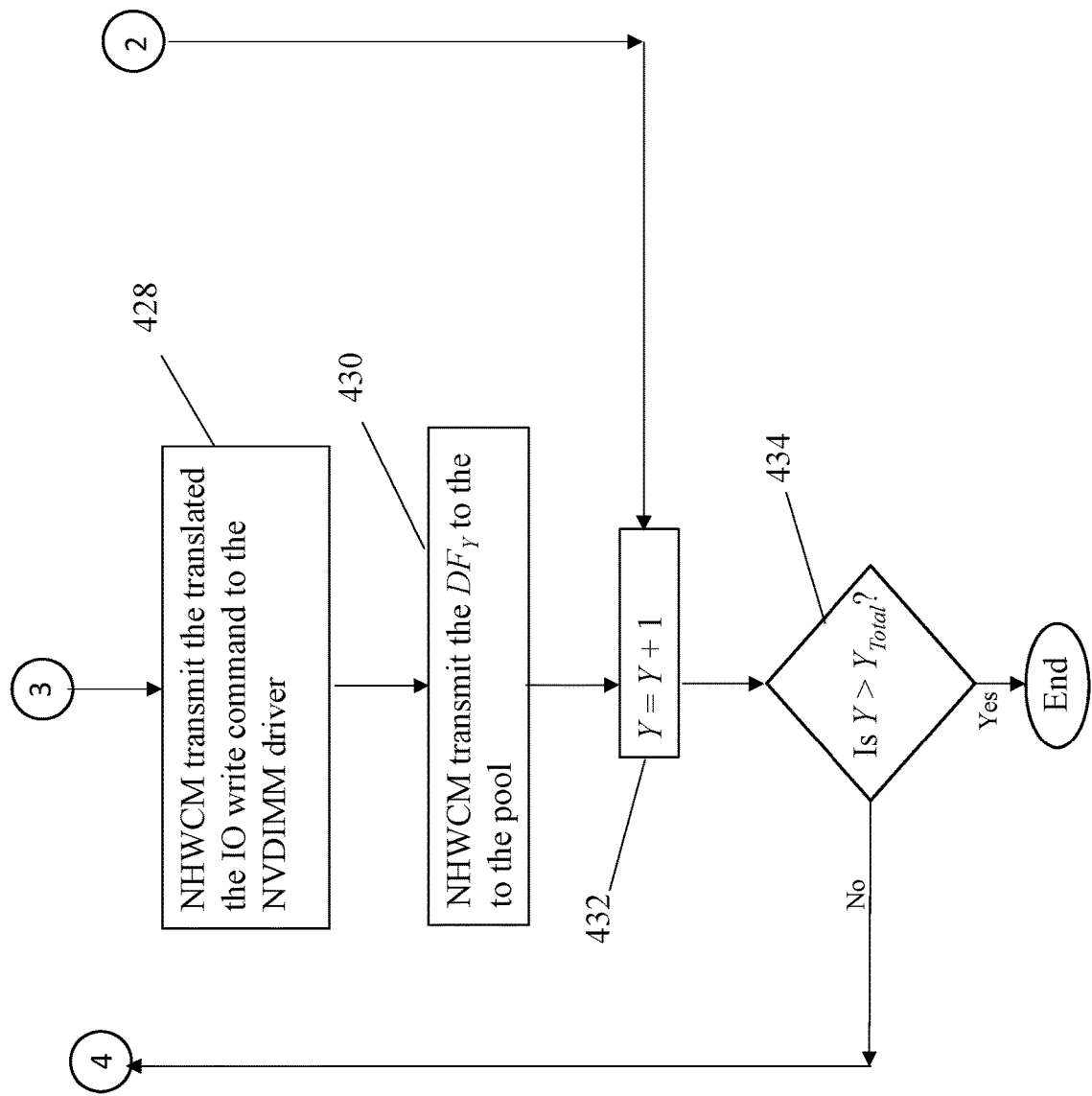

Referring to FIG. 4, a flow chart is provided illustrating a process 400 for writing files from a processing unit, i.e., the microprocessor 102 to either the NVDIMM HBA write cache pool 330 or the HBA write cache 324. Referring to FIGS. 3-4, a data write request 350 to persistent storage 326 is generated 402 through the application 304 and the filesystem 308, for example, and without limitation, as initiated through a user. The variable $Y_{Total}$ is assigned 404 to represent a quantity of data files to be written to persistent storage 326 from the CPU core 104 of the microprocessor 102 to the persistent storage 326. In one or more embodiments, only one file will be identified for writing to persistent storage 326. In at least one alternative embodiment, a plurality of files will be identified for writing to persistent storage 326. The variable $DF_Y$ is individually assigned 406 to each of the data files to be transmitted to storage 326 from the microprocessor 102. A corresponding data file (DF) variable, Y, is initialized 408. Accordingly, one or more data files ($DF_Y$) are identified for storage and the file-by-file process 400 is initialized.

The block device driver layer 310 receives the data write request 350 for the $DF_Y$ from the filesystem 308 and the associate I/O scheduler/request queue feature of the block device driver layer 310 and generates 410 an I/O request 352 therethrough. The I/O request 352 is transformed 412 into a SCSI write command 354 for the $DF_Y$ by the CDB generator resident within the SCSI middle layer 312 and the SCSI write command 354 is transmitted 414 to the NHWCM 314.

The NHWCM 314 acts to reserve and hold 416 the designated storage capacity in the NVDIMM array 328 for the virtual HBA write cache, i.e., the pool 330. Accordingly, for the array 328, the NHWCM 314 uses a predetermined configuration policy to utilize the segments 216, 220, 224, and 228 of each NVDIMM 204, 206, 208, and 210, respectively for receiving the plurality of $DF_Y$.

The NHWCM 314 determines storage options selected from the group consisting of at least one NVDIMM 204, 206, 208, and 210 includes sufficient capacity for storage of $DF_Y$ and the NVDIMM 204, 206, 208, and 210 does not include sufficient storage for $DF_Y$. Specifically, a determination operation 420 is executed as to whether the NHWCM 314 indicates that the pool 330 has sufficient storage space for $DF_Y$. A negative response to the determination operation 420 results in the NHWCM 314 directing the transmission 422 of the SCSI write command 354 for $DF_Y$ directly to the HBA device driver 110 resident within the SCSI host controller driver layer 316. Accordingly, if insufficient storage capacity resides on the pool 330 the $DF_Y$ 360 is directly transmitted 424 toward the persistent storage 326 through the HBA write cache 324.

A positive response to the determination operation 420 results in the SCSI write command 354 for the $DF_Y$ being received by the NHWCM 314 and the NHWCM 314 initializes a metadata record mapping structure (not shown) for the $DF_Y$ for managing the data write request 350. Specifically, a defined mapping mechanism 356 resident within the NHWCM 314 translates 426 the SCSI write command 354 for the $DF_Y$ into an I/O write command 358 with a predetermined metadata record mapping structure that is populated by the NHWCM 314 to form a metadata record. In one or more embodiments, the populated metadata record includes, without limitation, an I/O request number, a SCSI target device identifier (i.e., the HBA device 322 or the NVDIMM array 328), a logical unit number (LUN), a logical block address (LBA), user data, a sync-to-disk status (i.e., "synced" where the data is resident within the persistent storage 326 or "unsynced" where the data is not resident within the persistent storage 326), timestamp data, and data size for the $DF_Y$. Accordingly, a data write request 350 for the $DF_Y$ is transformed into a SCSI write command 354 that is converted into a translated I/O write command 358 by the NHWCM 314.

The NHWCM 314 transmits 428 the translated I/O write command 358 to the NVDIMM driver 318. The NVDIMM driver 318 can only be accessed by the NHWCM 314. The $DF_Y$ 362 is transmitted 430 to the pool 330 by the NHWCM 314. The NHWCM 314 transmits an acknowledgement (ACK) (not shown) of the successful writing of the $DF_Y$ 362 to the CPU core 104 once the $DF_Y$ 362 is resident on the pool 330. For example, in at least one embodiment, this acknowledgement is transmitted to the SCSI middle layer 312. The NVDIMM driver 318 saves the metadata record 364 associated with the translated I/O write command 358 to the pool 330, where the synchronization status of the file is "unsynced." After the data writing at the transmit operation 430, the data file counting variable Y is incremented 432. It is then determined 434 if all of the data files $DF_Y$ have been subject to writing to either the pool 330 or the HBA write cache 324 on HBA device 322. A negative response to the determination operation 434 returns the process 400 to the generate-an-I/O-request operation 10 and a positive response to the determination operation 434 concludes the process 400 of writing data. Accordingly, every data file $DF_Y$ identified for writing to persistent storage 326 is written to one of the persistent storage 326 via the HBA device 322 or written to the NVDIMM pool 330, where the selection is performed by the NHWCM 314.

Figure 5:
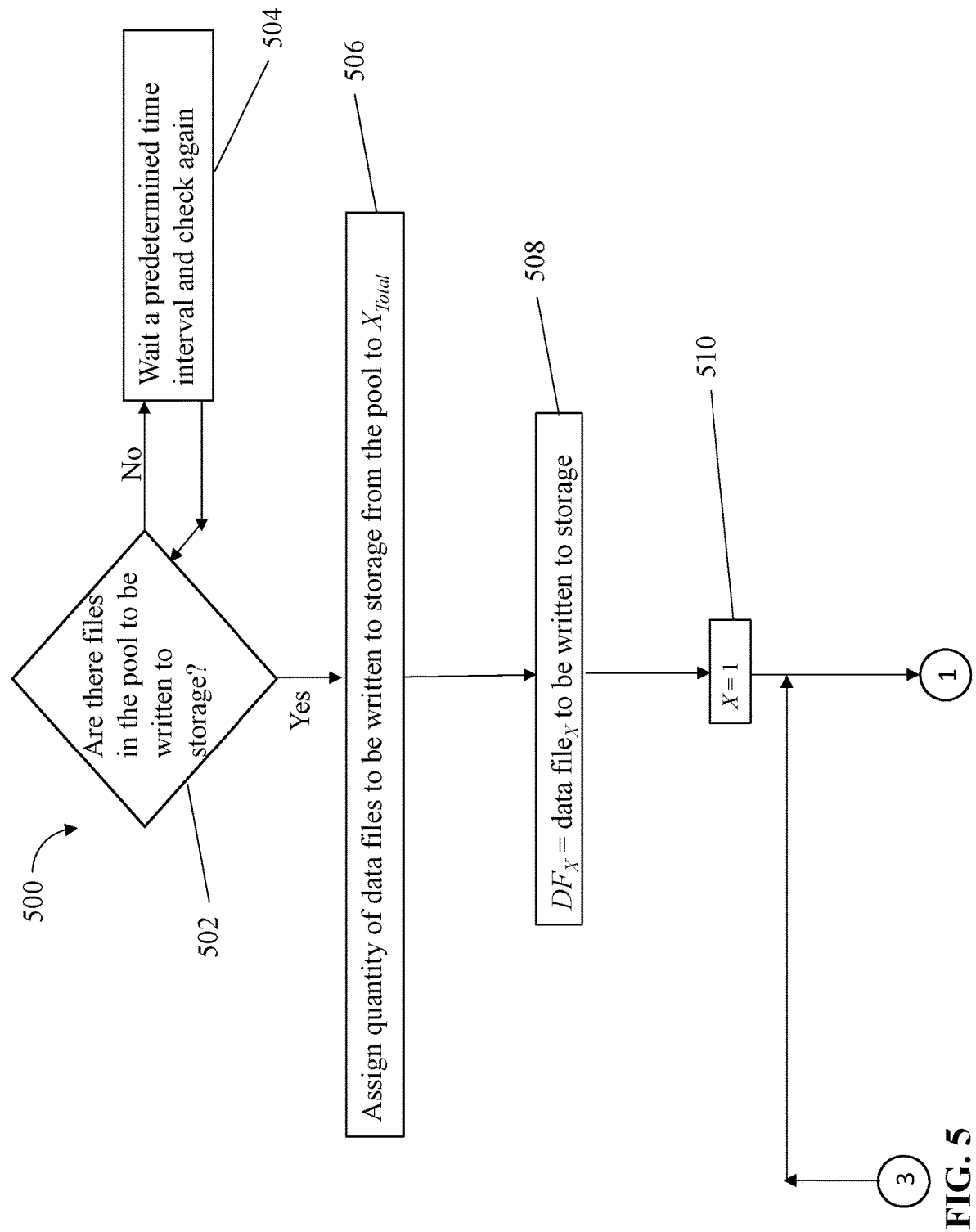
FIG. 5 depicts a flow chart illustrating a process for proactively writing files from a NVDIMM HBA write cache pool to persistent storage through the HBA write cache, in accordance with some embodiments of the present disclosure.
Figure 5:
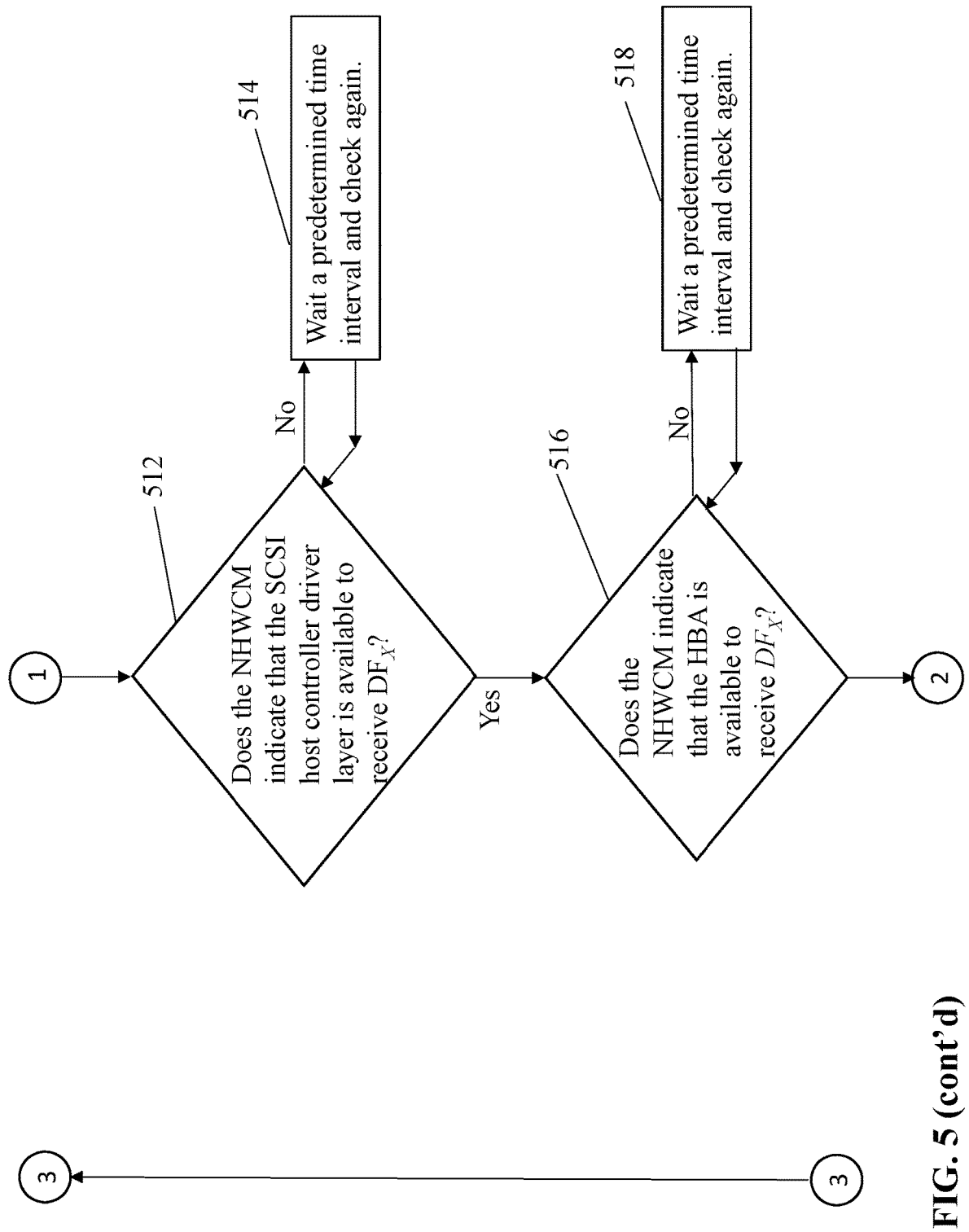
Figure 5:
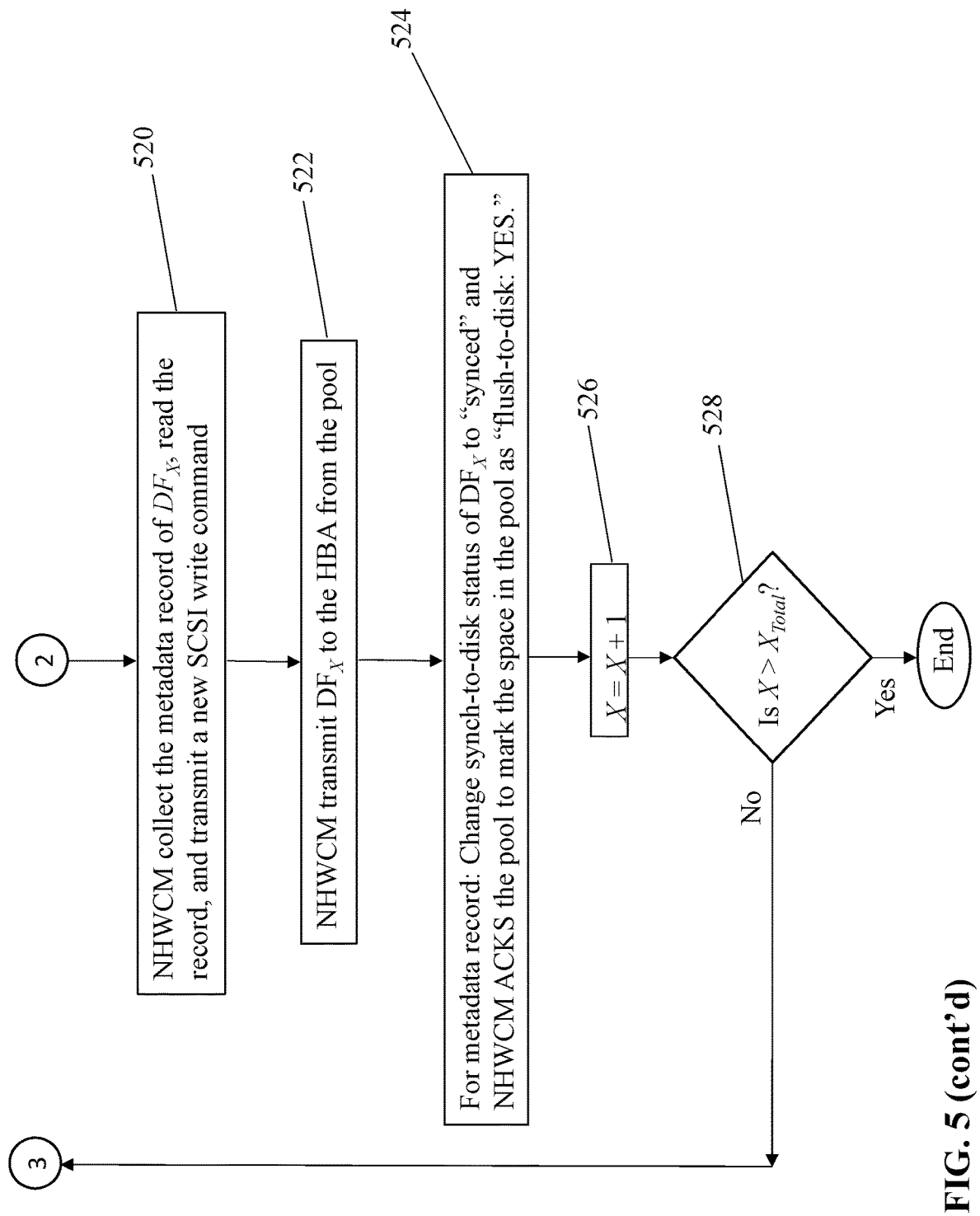

Referring to FIG. 5, a flow chart is provided illustrating a process 500 for proactively writing files from the NVDIMM HBA write cache pool 330 to the persistent storage 326 through the HBA write cache 324. The process 500 facilitates data writing from the NVDIMM HBA write cache pool 330 to the persistent storage 326 when the work load on the HBA device 322 is relatively low. In at least some embodiments, the files from the NVDIMM HBA write cache pool 330 are written directly to the persistent storage 326 by bypassing the HBA device 322. Referring to FIGS. 3 and 5, a determination operation 502 is executed as to whether the NHWCM 314 indicates that the pool 330 has files that need to be written to the persistent storage 326. Specifically, the NHWCM 314 determines if there are, or are not, "unsynced" data files on the pool 330 which need to transfer from the pool 330 to the persistent storage 326. A negative response to the determination operation 502 results in the NHWCM 314 waiting 504 for a predetermined time interval and returning to the determination operation 502 upon completion of the time interval. In some embodiments, the time interval is within a range of approximately one minute to several minutes. Accordingly, the computing hardware environment (system), i.e., the computer system 100 proactively and autonomously monitors the pool 330 for files that need to be synced, i.e., written to the persistent storage 326 through the NHWCM 314.

A positive response to the determination operation 502 results in the variable $X_{Total}$ being assigned 506 to represent a quantity of data files to be written to the persistent storage 326 from the pool 330. In one or more embodiments, only one file will be identified for writing to persistent storage 326. In at least one alternative embodiment, a plurality of files will be identified for writing to persistent storage 326. The variable $DF_X$ is individually assigned 508 to each of the data files to be written to storage 326 from the pool 330. A corresponding data file (DF) variable, X, is initialized 408. Accordingly, one or more data files ($DF_X$) are identified for storage and the file-by-file process 500 is initialized. The NHWCM 314 determines 512 if the queue (not shown) of the SCSI host controller driver layer 316 is available to receive the data file $DF_X$ from the pool 330. A negative response to the determination operation 512 results in the NHWCM 314 waiting 514 for a predetermined time interval and returning to the determination operation 512 upon completion of the time interval. In at least some embodiments, the time interval is selected to be approximately one minute. In some alternative embodiments, the selected time interval is any interval that enables operation of the computer system 100 as described herein. A positive response to the determination at the determination operation 512 results in the NHWCM 314 determining 516 if the HBA device 322 has capacity to accept the data file $DF_X$ from the pool 330. A negative response to the determination operation 516 results in the NHWCM 314 waiting 518 for a predetermined time interval and returning to the determination operation 516 upon completion of the time interval. In at least some embodiments, the time interval is selected to be approximately one minute. In some alternative embodiments, the selected time interval is any interval that enables operation of the computer system 100 as described herein. Accordingly, the NHWCM 314 determines if there are files to be transferred, the quantity of the files to be transferred, if the SCSI host controller driver layer 316 is available to process the files, and if the HBA device 322 has the capacity to receive the files.

A positive response to the determination the operation 516 results execution of three distinct operations in the NHWCM 314 as indicated by an operation block 520. Specifically, the three actions include obtaining 520 the metadata record 366 associated with the data file $DF_X$ from pool 330, reading 520 the metadata record 366, and transmitting 520 a new SCSI write command 368 to the HBA device driver 110 resident within the SCSI host controller driver layer 316. The metadata record 366 is maintained within the NHWCM 314 to create a new SCSI command when necessary. The NHWCM 314 transmits 522 the data file $DF_X$ 370 from the pool 330 to the HBA device 322 and the persistent storage 326. Once the data file $DF_X$ 370 is flushed to storage 326, the metadata record 366 is removed. Accordingly, the files resident on the pool 330 are written to the persistent storage 326 and the associated metadata records are removed.

After the metadata record 366 updating at the operation 524, the data file counting variable X is incremented 526. It is then determined 528 if all of the data files $DF_X$ have been subject to writing to the persistent storage 326 through the HBA device 322. A negative response to the determination operation 528 returns the process 500 to the determination operation 512 and a positive response to the determination operation 528 concludes the process 500 of writing data from the pool 330 to the persistent storage 326. Accordingly, every data file $DF_X$ resident on the pool 330 and identified for writing to persistent storage 326 is written to persistent storage 326 via the HBA device 322, where the process is managed by the NHWCM 314. Accordingly, the process 500 will leverage the computing hardware environment (system), i.e., the computer system 100 proactively and autonomously to consistently monitor the pool 330 for files that have been safely stored on the NVDIMMs 328 and to write these files to the persistent storage as intended through the NHWCM 314.

Figure 6:
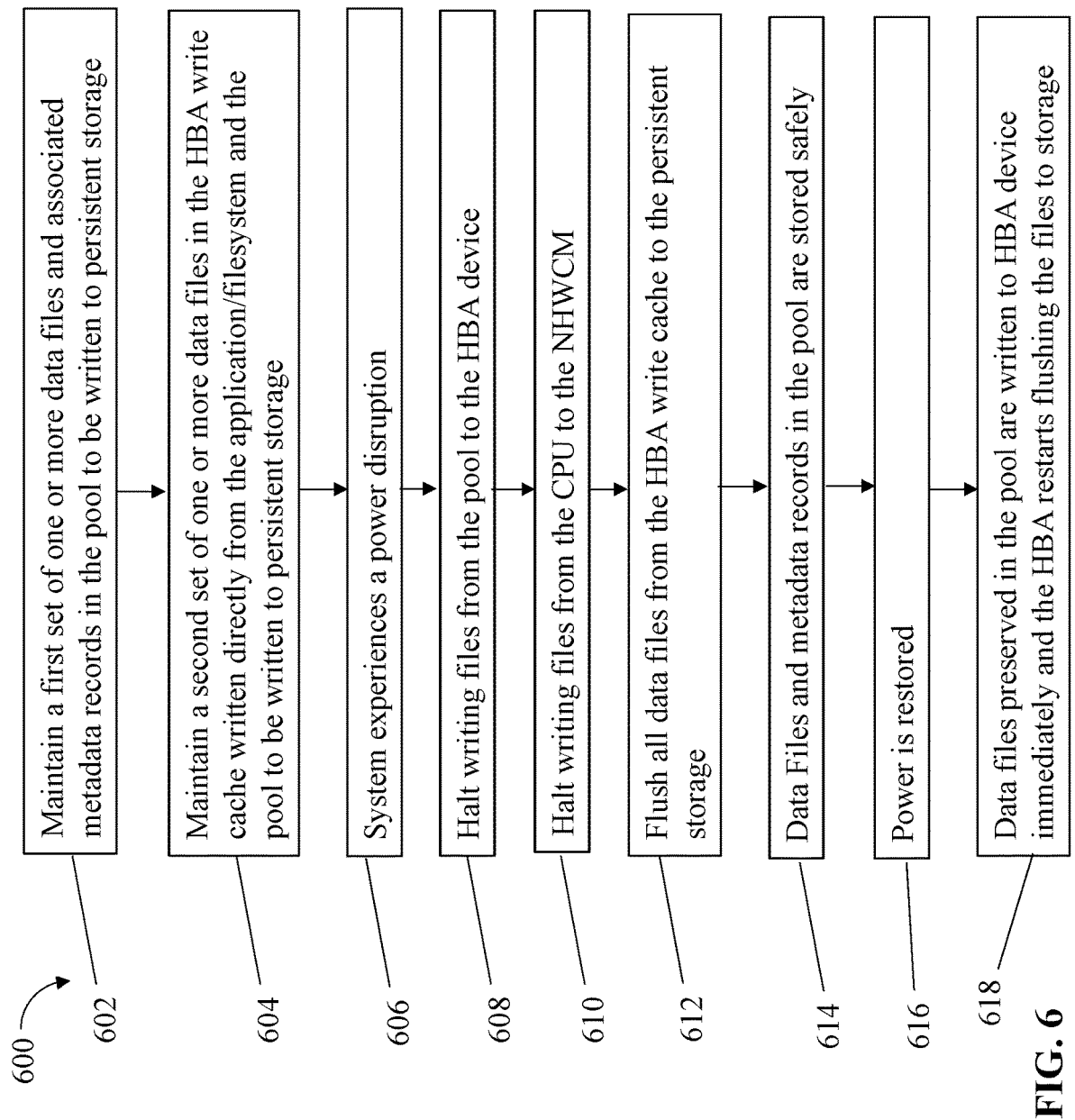
FIG. 6 depicts a flow chart illustrating a process for riding out and recovering from a power disruption, in accordance with some embodiments of the present disclosure.

Referring to FIG. 6, a flow chart is provided illustrating a process 600 for riding out and recovering from a power disruption. Referring to FIGS. 3 and 6, the process 600 includes maintaining 602 a first set of one of more data files on the pool 330. In at least one embodiment, in addition to the first data files, the metadata records associated with the first data files are also maintained on the pool 330. The first data files maintained on the pool 330 are to be eventually written to the persistent storage 326. The process also includes maintaining 604 a second set of one or more data files in the HBA write cache 324, where the second set of files are some combination of files written directly to the HBA device 322 from the application/filesystem (304/308) and the pool 330.

The computer system 100 experiences 606 an external electric power disruption. In one or more embodiments, the power disruption is a power fluctuation the lasts one to three cycles of a 50-Hertz or 60-Hertz electric power delivery system, where the range of one to three cycles is non-limiting. In at least one embodiment, the power disruption is due to brown-out conditions, i.e., a temporary system-wide, intentional voltage reduction of the electric power delivery system. In one embodiment, the power disruption is a blackout, where the voltage supplied by the electric power delivery system is reduced to zero or near-zero. In one or more embodiments, the computer system 100 recognizes the electric power disruption as negatively impacting operations and writing data files from the pool 330 to the HBA device 322 are halted 608 by the NHWCM 314. In addition, the writing of data files to the NHWCM 314 from the CPU core 104 are halted 610 by the NHWCM 314. In at least one embodiment, the HBA device 322 has sufficient reserve electric power onboard to support flushing 612 all of the files on the HBA write cache 324 to the persistent storage 326. In one or more embodiments, upon halting the flushing of the data files from the HBA write cache 324 to persistent storage 326, if there is sufficient power remaining on the HBA device 322, any remaining files will be held thereon until the external power is restored. In one or more alternative embodiments, the persistent storage 326 may include one or more flash devices (not shown) that will receive any of the data files on the HBA write cache 324 for later transfer to persistent disk storage (not shown), thereby clearing all data files from the HBA write cache 324. Accordingly, the writing of files to the HBA device 322 from all sources is halted and the HBA write cache 324 is evacuated through writing the data files thereon to the persistent storage 326.

The data files and the associated metadata records are stored safely 614 on the non-volatile memory modules (NVDIMMs) 328 that define the pool 330. After the external electric power is restored 616, the preserved metadata records for the preserved data files to be transferred from the pool 330 to the HBA device 322 are used to immediately restart 618 the writing of the designated data files on the pool 330 to the HBA device 322, such data files being subsequently flushed to the persistent storage 326. Accordingly, the data files that may have been potentially lost or corrupted during the electric power disruption are preserved, and the electric power disruption is successfully ridden-out by the computer system 100.

Accordingly, the expansion of HBA write cache using NVDIMMs results in a practical application of an improvement to the functioning of the associated computing systems, and specifically, through using at least a portion of available NVDIMM capacity to retain data that is to be written to persistent storage to reduce the potential for data loss during power cycling.

Figure 7:
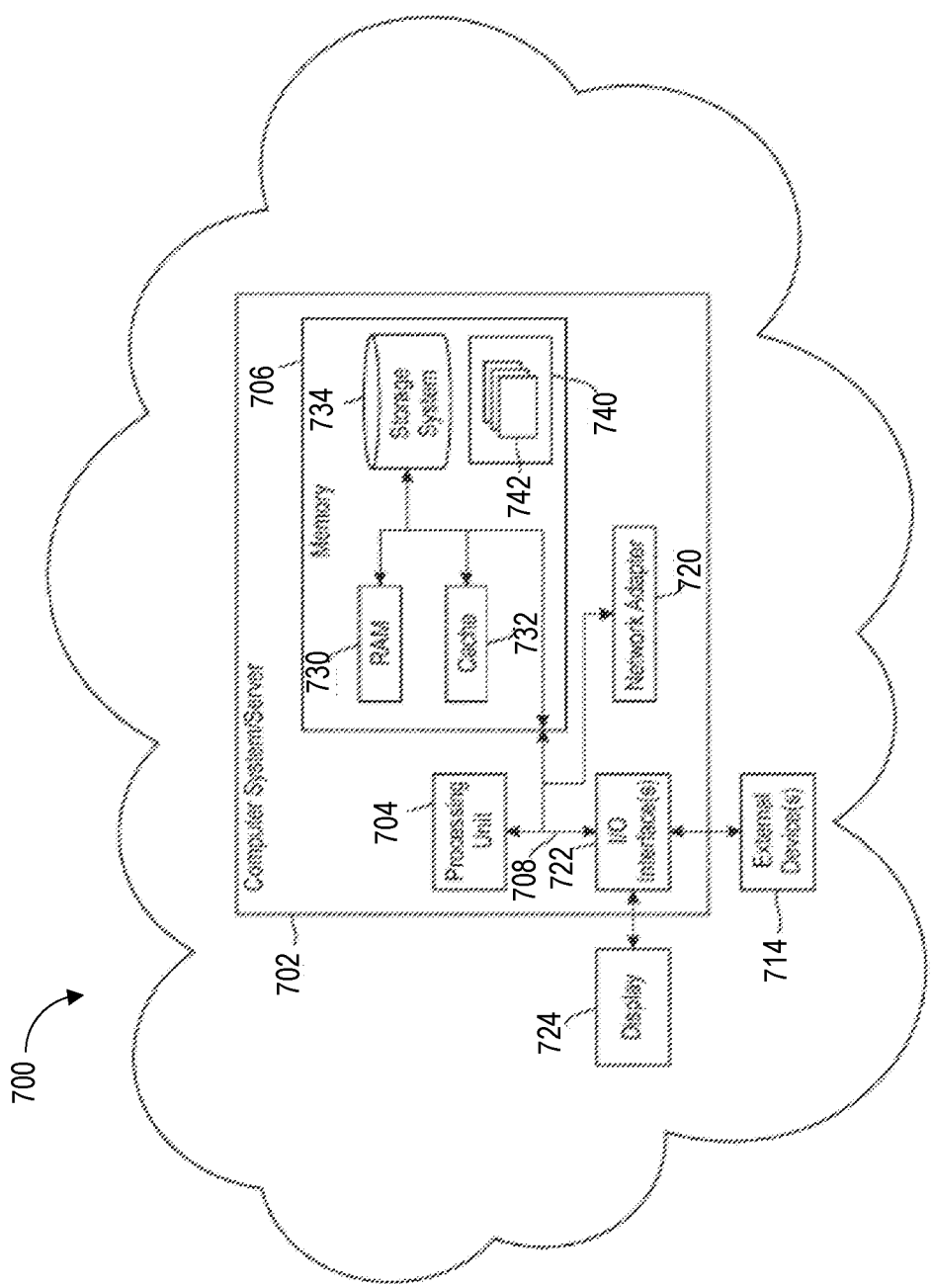
FIG. 7 depicts a block diagram illustrating a computer system/server of a cloud-based support system, to implement the processes described above with respect to FIGS. 1-6, in accordance with some embodiments of the present disclosure.

Aspects of the NHWCM 314 and its associated functionality to execute expansion of the HBA write cache 324 may be embodied in a computer system/server in a single location, or in at least one embodiment, may be configured in a cloud-based system sharing computing resources. With reference to FIG. 7, a block diagram is provided illustrating an example of a computer system 700 including a computer/server 702, hereinafter referred to as a host 702 in communication with a cloud based support system, to implement the system, tools, and processes described above with respect to FIGS. 1-6. Host 702 is operational with numerous other general purpose or special purpose computing system environments or configurations. Examples of well-known computing systems, environments, and/or configurations that may be suitable for use with host 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 702 may be described in the general context of computer system-executable instructions, such as program modules, being executed by a computer system. Generally, program modules may include routines, programs, objects, components, logic, data structures, and so on that perform particular tasks or implement particular abstract data types. Host 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, host 702 is shown in the form of a general-purpose computing device. The components of host 702 may include, but are not limited to, one or more processors or processing devices or units 704, e.g. hardware processors, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 702 typically includes a variety of computer system readable media. Such media may be any available media that is accessible by host 702 and it includes both volatile and non-volatile media, removable and non-removable media.

Memory 706 can include computer system readable media in the form of volatile memory, such as random access memory (RAM) 730 and/or cache memory 732. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces.

Program/utility 740, having a set (at least one) of program modules 742, may be stored in memory 706 by way of example, and not limitation, as well as an operating system, one or more application programs, other program modules, and program data. Each of the operating systems, one or more application programs, other program modules, and program data or some combination thereof, may include an implementation of a networking environment. Program modules 742 generally carry out the functions and/or methodologies of embodiments to dynamically process an untrusted training data set to identify potentially poisoned data and remove the identified data from a corresponding neural model. For example, the set of program modules 742 may include the NHWCM 314 as described in FIGS. 3-6.

Host 702 may also communicate with one or more external devices 714, such as a keyboard, a pointing device, etc.; a display 724; one or more devices that enable a user to interact with host 702; and/or any devices (e.g., network card, modem, etc.) that enable host 702 to communicate with one or more other computing devices. Such communication can occur via Input/Output (I/O) interface(s) 722. Still yet, host 702 can communicate with one or more networks such as a local area network (LAN), a general wide area network (WAN), and/or a public network (e.g., the Internet) via network adapter 720. As depicted, network adapter 720 communicates with the other components of host 702 via bus 708. In at least one embodiment, a plurality of nodes of a distributed file system (not shown) is in communication with the host 702 via the I/O interface 722 or via the network adapter 720. It should be understood that although not shown, other hardware and/or software components could be used in conjunction with host 702. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 706, including RAM 730, cache memory 732, and storage system 734, such as a removable storage drive and a hard disk installed in a hard disk drive.

Computer programs (also called computer control logic) are stored in memory 706. Computer programs may also be received via a communication interface, such as network adapter 720. Such computer programs, when run, enable the computer system to perform the features of the present embodiments as discussed herein. In particular, the computer programs, when run, enable the processing unit 704 to perform the features of the computer system. Accordingly, such computer programs represent controllers of the computer system. Accordingly, the functionality for the NHWCM 314 as described in FIGS. 3-6, is embodied as computer program code stored in memory 706 (in some embodiments as program modules 742), where the computer program code includes the instructions to be executed by the processing device 704 to provide at least a portion of the functionality of the NHWCM 314 as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the NHWCM 314 as described in FIGS. 3-6, may be embodied as computer program instructions to be executed by one or more hardware devices other than, or in addition to, the processing device 704 to provide at least a portion of the functionality of the NHWCM 314 as described herein.

In one or more embodiments, host 702 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
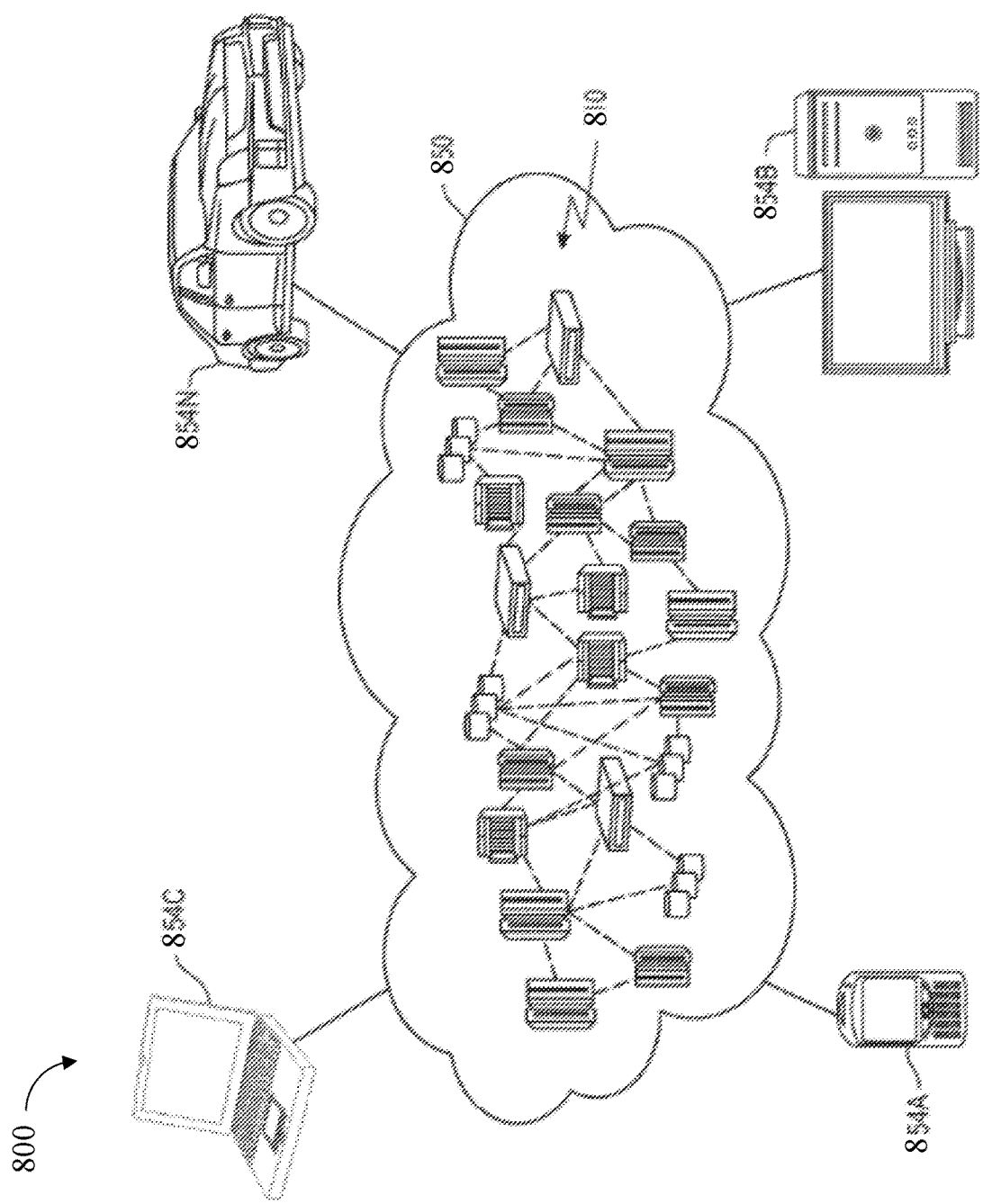
FIG. 8 depicts a schematic diagram illustrating a cloud computer environment, in accordance with some embodiments of the present disclosure.

Referring now to FIG. 8, a schematic diagram is provided illustrating an example cloud computing network 800. As shown, cloud computing network 800 includes a cloud computing environment 850 having one or more cloud computing nodes 810 with which local computing devices used by cloud consumers may communicate. Examples of these local computing devices include, but are not limited to, personal digital assistant (PDA) or cellular telephone 854A, desktop computer 854B, laptop computer 854C, and/or automobile computer system 854N. Individual nodes within nodes 810 may further communicate with one another. They may be grouped (not shown) physically or virtually, in one or more networks, such as Private, Community, Public, or Hybrid clouds as described hereinabove, or a combination thereof. This allows the cloud computing network 800 to offer infrastructure, platforms and/or software as services for which a cloud consumer does not need to maintain resources on a local computing device. It is understood that the types of computing devices 854A-N shown in FIG. 8 are intended to be illustrative only and that the cloud computing environment 850 can communicate with any type of computerized device over any type of network and/or network addressable connection (e.g., using a web browser).

Figure 9:
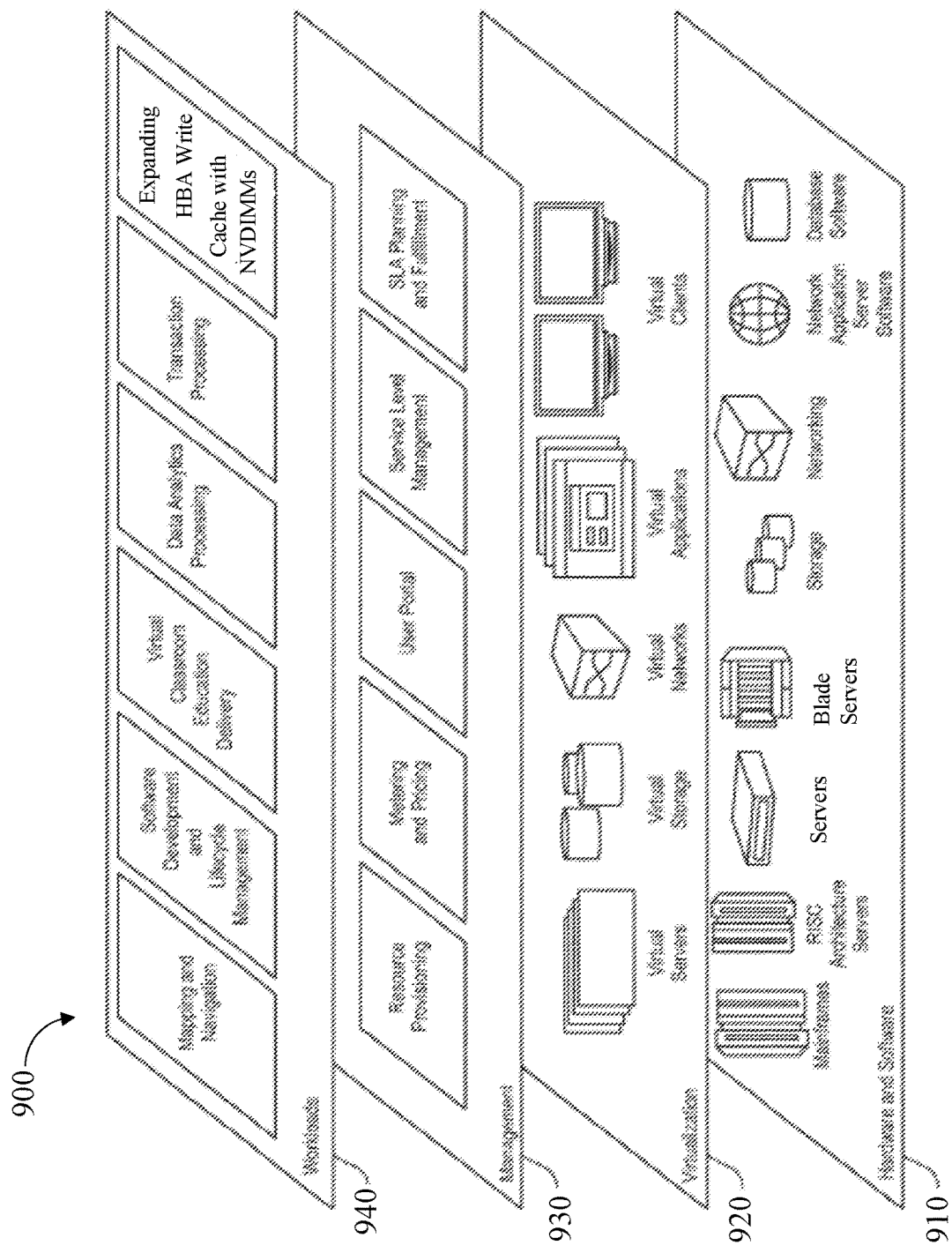
FIG. 9 depicts a block diagram illustrating a set of functional abstraction model layers provided by the cloud computing environment, in accordance with some embodiments of the present disclosure.

Referring now to FIG. 9, a set of functional abstraction layers 900 provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer 910, virtualization layer 920, management layer 930, and workload layer 940.

The hardware and software layer 910 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 920 provides an abstraction layer from which the following examples of virtual entities may be provided: virtual servers; virtual storage; virtual networks, including virtual private networks; virtual applications and operating systems; and virtual clients.

In one example, management layer 930 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer 940 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and HBA write cache expansion with NVDIMMs.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
 a processing device;
 a host bus adaptor (HBA) in communication with the processing device;
 at least one persistent storage device in communication with the HBA;
 a memory operatively coupled to the processing device, the memory comprising at least one non-volatile dual in-line memory module (NVDIMM), the memory further comprising a NVDIMM HBA Write Cache Module (NHWCM), the NHWCM in communication with the HBA and the NVDIMM, the NHWCM configured to:
  determine there is a least one file to be written to the persistent storage from the processing device;
  determine that the NVDIMM includes sufficient storage capacity for storage of the at least one file;
  write the at least one file to the NVDIMM;
  determine that the HBA is available to receive the at least one file from the NVDIMM; and
  write the at least one file to the persistent storage from the NVDIMM through the HBA.

2. The system of claim 1, further comprising the NHWCM configured to:
  determine there is a second file to be written to the persistent storage from the processing device;
  determine that the NVDIMM does not include sufficient storage capacity for the second file; and
  write the second file to the HBA.

3. The system of claim 1, further comprising the NHWCM configured to:
  maintain storage of a plurality of files to be written to the persistent storage throughout a disruption of external electric power to the processing device, the NVDIMM, and HBA.

4. The system of claim 3, further comprising the NHWCM configured to:
  write the plurality of files to persistent storage from the NVDIMM through the HBA upon restoration of external electric power.

5. The system of claim 1, further comprising the NHWCM configured to:
  populate a record mapping structure resident within the NVDIMM with mapping information facilitating:
    writing of the at least one file from the processing device to the NVDIMM; and
    writing of the at least one file from the NVDIMM to the persistent storage.

6. The system of claim 1, wherein the NVDIMM comprises a plurality of NVDIMMs, wherein at least a portion of each NVDIMM is reserved by the NHWCM for dedicated storage of files to be written to the persistent storage to define a plurality of reserved portions of the NVDIMMs, wherein the plurality of reserved portions of the NVDIMMs defines an NVDIMM HBA write cache pool.

7. The system of claim 1, further comprising the NHWCM configured to:
  initialize and populate a metadata record for each file, the metadata record to facilitate writing the file to the NVDIMM from the processing device and writing the file from the NVDIMM to the persistent storage.

8. A computer program product for file data management, the computer program product comprising one or more computer readable storage media, and program instructions collectively stored on the one or more computer storage media, the program instructions comprising:
  program instructions to determine there is a least one file to be written to persistent storage from a processing device;
  program instructions to determine that at least one non-volatile dual in-line memory module (NVDIMM) includes sufficient storage capacity for storage of the at least one file;
  program instructions to write the at least one file to the NVDIMM;
  program instructions to determine that a host bus adaptor (HBA) is available to receive the at least one file from the NVDIMM; and
  program instructions to write the at least one file to the persistent storage from the NVDIMM through the HBA.

9. The computer program product of claim 8, further comprising program instructions to:
  determine through a NVDIMM HBA Write Cache Module (NHWCM) that at least a portion of the NVDIMM includes sufficient storage capacity for a file transfer of the at least one file designated for writing to the persistent storage through the HBA, wherein the processing device, NVDIMM, HBA, NHWCM, and the persistent storage are in operable communication.

10. The computer program product of claim 9, further comprising program instructions to:
  determine, through the NHWCM, that there is a second file to be written to the persistent storage from the processing device;
  determine that the NVDIMM does not include sufficient storage capacity for the second file; and
  write the second file to the HBA.

11. The computer program product of claim 9, further comprising program instructions to:
  maintain storage of a plurality of files to be written to the persistent storage on the NVDIMM through disruption of external electric power to the NVDIMM and the HBA.

12. The computer program product of claim 11, further comprising program instructions to:
  write the plurality of files to the persistent storage from the NVDIMM through the HBA upon restoration of external electric power.

13. The computer program product of claim 9, further comprising program instructions to:
  initialize and populate a metadata record for each file, the metadata record to facilitate writing each file to the NVDIMM from the processing device and writing each file from the NVDIMM to the persistent storage.

14. A computer-implemented method comprising:
  determining there is a least one file to be written to persistent storage from a processing device;
  determining that at least one non-volatile dual in-line memory module (NVDIMM) includes sufficient storage capacity for storage of the at least one file;
  writing the at least one file to the NVDIMM;
  determining that a host bus adaptor (HBA) is available to receive the at least one file from the NVDIMM; and
  writing the at least one file to the persistent storage from the NVDIMM through the HBA.

15. The method of claim 14, further comprising:
  determining, through a NVDIMM HBA Write Cache Module (NHWCM), that at least a portion of the NVDIMM includes sufficient storage capacity for a file transfer of the at least one file designated for writing to the persistent storage through the HBA, wherein the processing device, NVDIMM, HBA, NHWCM, and the persistent storage are in operable communication with each other.

16. The method of claim 15, further comprising:
  determining, through the NHWCM, that there is a second file to be written to the persistent storage from the processing device;
  determining, through the NHWCM, that the NVDIMM does not include sufficient storage capacity for the second file; and
  writing the second file to the HBA.

17. The method of claim 15, further comprising:
maintaining storage of a plurality of files to be written to the persistent storage on the NVDIMM through disruption of external electric power to the NVDIMM and the HBA.

18. The method of claim 17, further comprising:
writing the plurality of files to the persistent storage from the NVDIMM through the HBA upon restoration of external electric power.

19. The method of claim 14, further comprising:
initializing and populating a metadata record for each file, the metadata record to facilitate writing each file to the NVDIMM from the processing device and writing each file from the NVDIMM to the persistent storage.

20. The method of claim 14, wherein writing the at least one file to the NVDIMM comprises determining an NVDIMM from a plurality of NVDIMMs to write the at least one file thereto, wherein the plurality of NVDIMMS defines a NVDIMM HBA write cache pool.

\* \* \* \* \*